H. C. NIMRICK.
MOTORCYCLE STAND.
APPLICATION FILED JAN. 21, 1919.
1,314,421.
Patented Aug. 26, 1919.
3 SHEETS—SHEET 1.
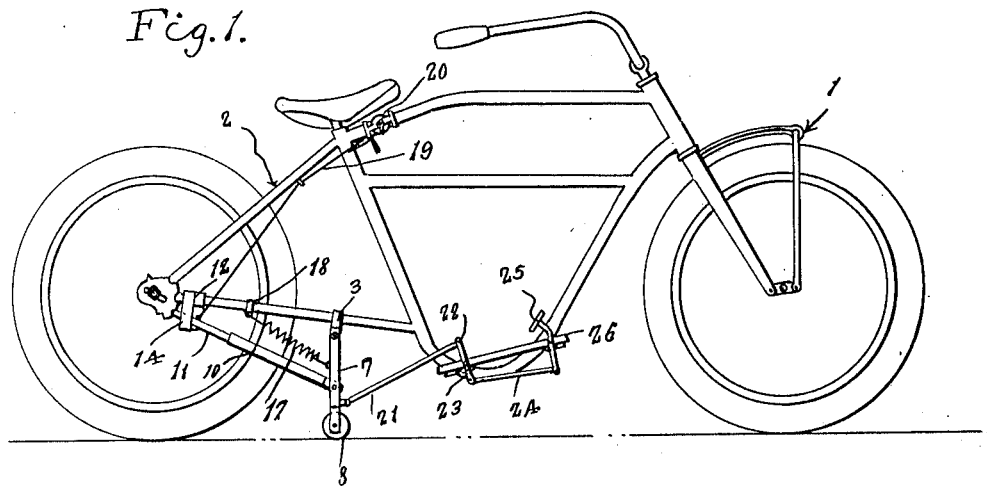
Fig. 1.
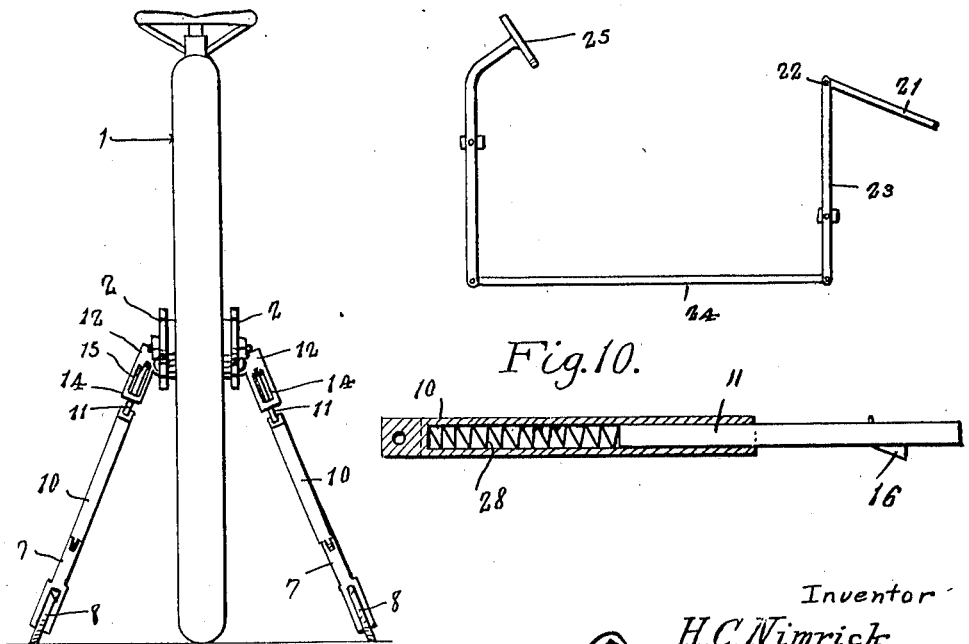
Fig. 2.   Fig. 5.
Fig. 10.
Inventor
H. C. Nimrick
By [signature]
Attorney H. C. NIMRICK.
MOTORCYCLE STAND.
APPLICATION FILED JAN. 21, 1919.
1,314,421.
Patented Aug. 26, 1919.
3 SHEETS—SHEET 2.
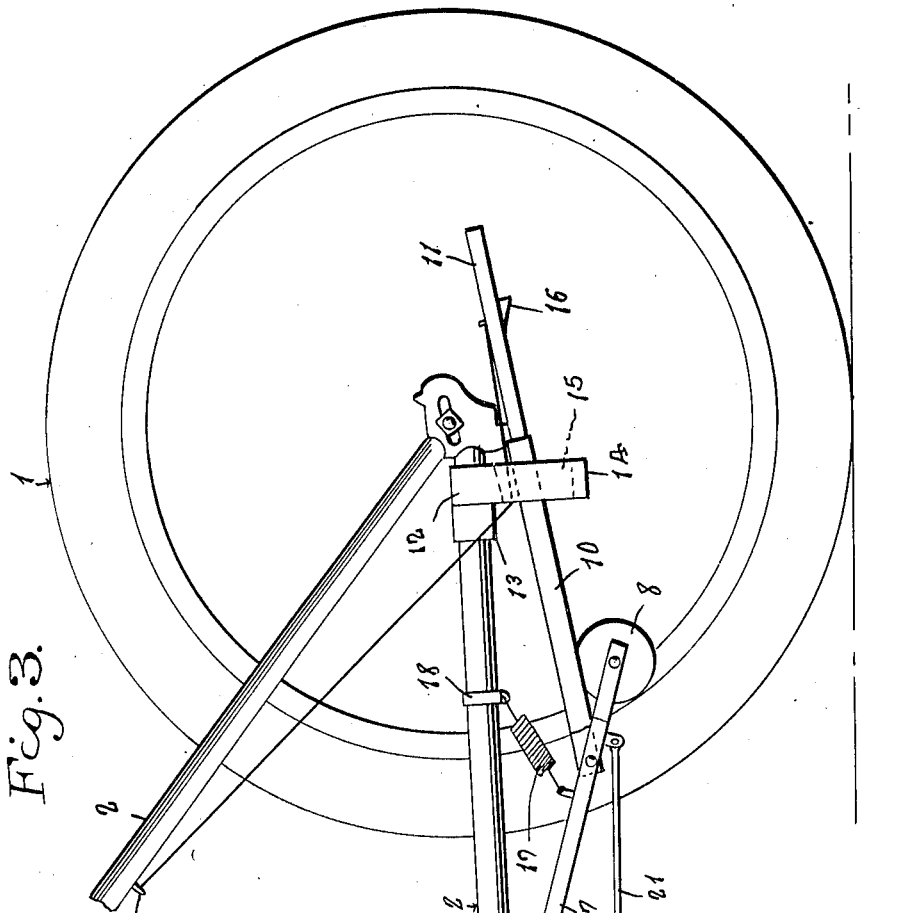
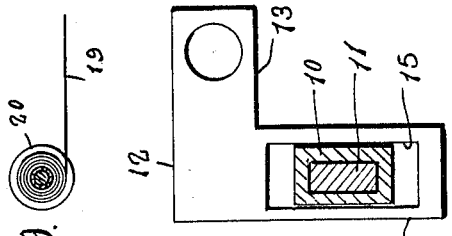
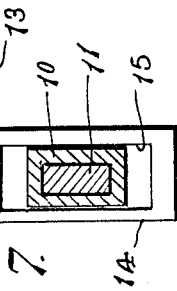
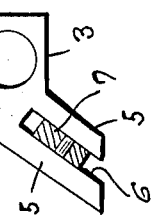
Inventor.
H. C. Nimrick.
By
Attorney H. C. NIMRICK.
MOTORCYCLE STAND.
APPLICATION FILED JAN. 21, 1919.
1,314,421.
Patented Aug. 26, 1919.
3 SHEETS—SHEET 3.
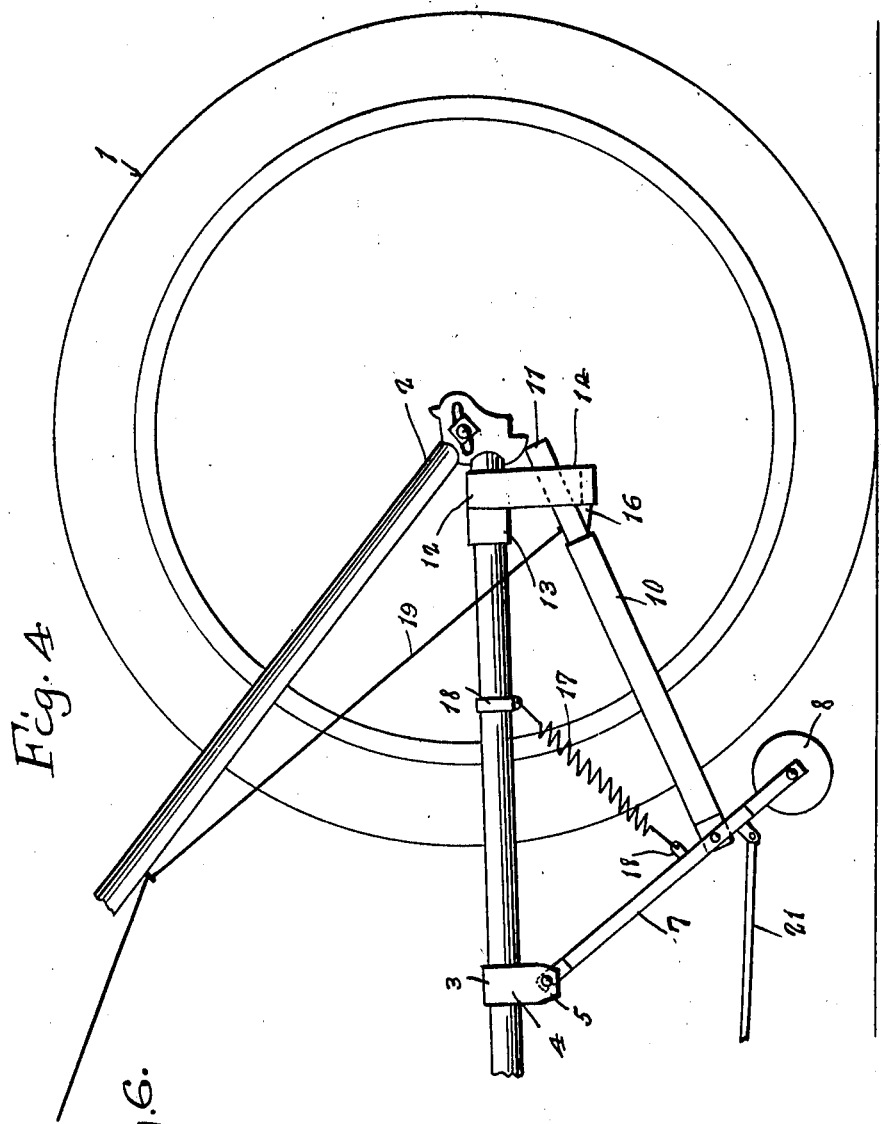
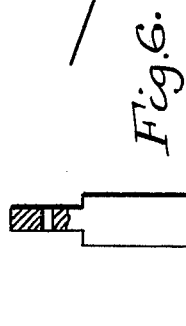
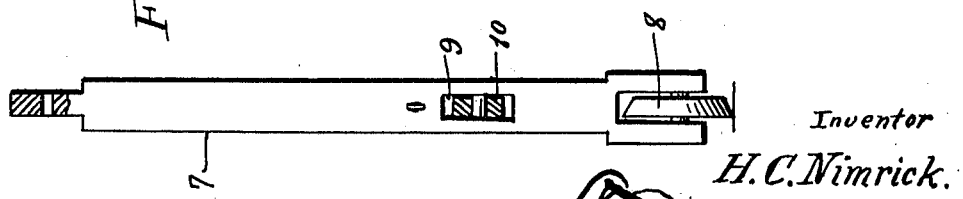
Inventor
H. C. Nimrick.

UNITED STATES PATENT OFFICE.

HAROLD C. NIMRICK, OF EVERETT, WASHINGTON.

MOTORCYCLE STAND.

1,314,421.  Specification of Letters Patent.  Patented Aug. 26, 1919.

Application filed January 21, 1919. Serial No. 272,386.

*To all whom it may concern:*

Be it known that I, HAROLD C. NIMRICK, a citizen of the United States, residing at Everett, in the county of Snohomish and State of Washington, have invented certain new and useful Improvements in Motor-Cycle Stands; and I do hereby declare the following to be a full, clear, and exact description of the invention, such as will enable others skilled in the art to which it appertains to make and use the same.

This invention relates to improvements in motorcycle stands and has for one of its objects the provision of means whereby the stand can be conveniently moved into and out of supporting position without manually lifting the motorcycle off the ground.

Another object of this invention is the provision of means whereby the stand may be left in a supporting position while the motorcycle is traveling at a slow rate of speed, thus rendering easy to control in traffic and also permits a person to learn to ride or balance the motorcycle without the aid of another person.

A further object of this invention is the provision of means for permitting the stand to give slightly vertically when under increased weight, so that a person may lean to one side when turning a corner with the stand in supporting position, caused by either a person forgetting to raise the stand or when having to stop and start while in traffic.

A still further object of this invention is the provision of a motorcycle stand of the above stated character, which shall be simple, durable and efficient and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a side elevation of a motorcycle having a stand applied thereto and constructed in accordance with my invention, Fig. 2 is a rear elevation of the same, Fig. 3 is a fragmentary side elevation, illustrating the stand in an elevated position, Fig. 4 is a similar view, illustrating the position of the stand when the motorcycle is turning a corner with the stand in a supporting position, Fig. 5 is a detail view of the operating means for the stand, Fig. 6 is a plan view of one of the supporting legs, Fig. 7 is an end elevation of one of the attaching brackets, Fig. 8 is a detail view of one of the catch brackets, Fig. 9 is a detail sectional view of a spring roller, Fig. 10 is a detail sectional view of a telescopic rod.

Referring in detail to the drawings, the numeral 1 indicates a motorcycle having the rear forks 2 to which my invention is applied. Attaching brackets 3 are welded or otherwise secured to the forward ends of the horizontal portions of the rear forks 2, and include body portions 4 that are secured to the forks and have formed thereon outwardly and downwardly extending arms 5 which are slotted as shown at 6 and have the upper ends of legs 7 pivoted therein. The lower ends of the legs 7 are forked and have journaled therein wheels or rollers 8, the peripheries thereof being beveled to agree with the inclination of the legs and to provide even bearing surfaces for the wheels or rollers on the ground. The legs 7 have slots 9 adjacent their lower ends and in which are pivoted rods 10 of the telescopic type, the free ends of the inner sections 11 being slidably received in catch brackets secured to the rear ends of the horizontal portions of the forks 2.

The catch brackets 12 include body portions 13 that are secured to the forks 2 and have formed thereon downwardly depending arms 14 which are provided with slots 15 to slidably receive the free ends of the rods 10. Shoulders 16 are formed on the rods 10 and are adapted to engage the lower ends of the arms 14 to hold the legs vertically or in supporting position. Springs 17 are secured to the legs 10 and to the horizontal portions of the forks 2 by clips 18 and are adapted to draw said legs upwardly when the shoulders 16 are disengaged from the arms 14, thereby placing the device in an inoperative position. Cords or flexible elements 19 are secured to the rods 10 adjacent the shoulders and extend upwardly to a spring rewound roller 20 mounted on the forward portion of the motorcycle 1. The cords or flexible elements 19 are wound and secured onto the roller 20 to place said cords under a slight tension and which provides means whereby the operator can give a slight pull on the cords to disengage the shoulders 16 from the arms 14, permitting the legs to move into an inoperative position.

Rods 21 are secured to the lower ends of the legs 7 by pivotal connections and have their forward ends connected by a rod 22 located under the forward portion of the motorcycle 1. A bell crank lever 23 is pivoted to the frame of the motorcycle and has one end connected to the rod 22 while its other end is pivoted to a rod 24. The rod 24 is pivoted to the lower end of a foot pedal 25 which is pivoted to one of the running boards 26 of the motorcycle so that the operator can draw the legs 7 downwardly to supporting position by pressing on said foot pedal and without lifting up the rear end of the motorcycle manually. When in this position the motorcycle can be left standing or can be ridden by an unskilled person at a slow rate of speed so that the balancing art can be readily learned without the aid of another person.

Springs 28 are located in the hollow sections of the rods 10 and bear against the inner ends of the sections 11 for permitting a slight rearward movement of the legs when the motorcycle leans on a curve and when traveling at a slow rate of speed with the legs in an operative position. When the legs are moved rearwardly they elevate the wheels or rollers 8 a slight distance from the ground as illustrated in Fig. 4.

In operation, when the motorcycle is being supported by the legs and it is desired to ride the same, the operator pulls upon the cords 19 disengaging the shoulders 16 from the catch brackets 12 and the springs 17 swing the legs upwardly and rearwardly and support them in this position so that they will not interfere with the riding of the motorcycle. When stopping, the operator pushes on the foot pedal, causing the legs to be pushed downwardly engaging the wheels with the ground thereby supporting the motorcycle in an upright position.

While I have shown and described the preferred embodiment of my invention, it will be understood that minor changes in construction, combination, and arrangement of parts may be made without departing from the spirit and scope of the invention as claimed.

Having thus described my invention, what I claim is:

A motorcycle stand including rear forks, legs pivoted to said forks, rods pivoted to said legs, brackets secured to said forks, and having slots therein to receive the rods, shoulders formed on said rods and adapted to engage the brackets to hold the legs in supporting position, means disengaging the shoulders from the brackets, rods pivoted to said legs, a rod connecting the second named rods, a pivotally mounted lever connected to said rod, and a foot pedal pivotally mounted and connected to said lever for moving the legs into supporting position, and means returning the legs to non-supporting position.

In testimony whereof I affix my signature in presence of two witnesses.

HAROLD C. NIMRICK.

Witnesses:
F. T. SWALE,
G. S. JUDD.

Copies of this patent may be obtained for five cents each, by addressing the "Commissioner of Patents, Washington, D. C."